(12) United States Patent
Viaud

(10) Patent No.: US 8,281,713 B2
(45) Date of Patent: Oct. 9, 2012

(54) ROUND BALER

(75) Inventor: Jean Viaud, Reyssouze (FR)

(73) Assignee: Deere & Company, Moline, IL (US)

( * ) Notice: Subject to any disclaimer, the term of this patent is extended or adjusted under 35 U.S.C. 154(b) by 80 days.

(21) Appl. No.: 12/765,334

(22) Filed: Apr. 22, 2010

(65) Prior Publication Data

US 2011/0100236 A1    May 5, 2011

(30) Foreign Application Priority Data

Apr. 23, 2009    (DE) .......................... 10 2009 002 585

(51) Int. Cl.
     *B30B 5/06*      (2006.01)
     *A01D 39/00*      (2006.01)
(52) U.S. Cl. .......................................... 100/88; 56/341
(58) Field of Classification Search .................... 100/87, 100/88, 89; 56/341
See application file for complete search history.

(56) References Cited

U.S. PATENT DOCUMENTS

| | | | | |
|---|---|---|---|---|
| 4,763,464 | A | * | 8/1988 | Mouret ........................... 56/341 |
| 4,870,812 | A | * | 10/1989 | Jennings et al. ................ 56/341 |
| 5,367,865 | A | | 11/1994 | Jennings et al. |
| 6,094,900 | A | | 8/2000 | Underhill et al. |
| 7,165,491 | B2 | | 1/2007 | Viaud |
| 2007/0289454 | A1 | * | 12/2007 | Meinders ........................ 100/88 |

FOREIGN PATENT DOCUMENTS

EP    1308078    5/2003

\* cited by examiner

*Primary Examiner* — Jimmy T Nguyen

(57) ABSTRACT

A round baler is provided for producing bales. The baler has a bale-forming chamber, at least one roller that is driven and that defines a part of an extent of the bale-forming chamber and that is mounted on a moving holder. Continuous, flexible bale forming elements are driven and define another part of the extent of the bale-forming chamber. The bale forming elements contact a first rotating body and a second rotating body, of which the first rotating body is mounted on the holder. It is proposed that the second rotating body is coupled with the holder with respect to motion by a drive connection, so that both move together with the growing bale.

13 Claims, 5 Drawing Sheets

ROUND BALER

FIELD OF THE INVENTION

The invention relates to a round baler for producing bales, wherein the round baler has a bale-forming chamber, at least one drivable roller that defines a part of the periphery of the bale-forming chamber and that is mounted on a moving holder, and a drivable, continuous, flexible bale forming means that defines another part of the periphery of the bale-forming chamber and that contacts a first rotating body and a second rotating body, wherein the first rotating body is mounted on the holder.

BACKGROUND OF THE INVENTION

Balers are used in agriculture to take up harvested material from a field and form it into a bale. In addition to rectangular balers in which a plunger cyclically compresses the harvested material in a baling chamber, round balers are common in which the taken-up harvested material is introduced into a cylindrical bale-forming chamber and there set into rotation by driven elements. In the case of round balers, embodiments with a fixed bale size are known in which the periphery of the bale-forming chamber is defined by rollers or rotating bodies connected rigidly to the frame of the baler, and embodiments with variable bale size in which a flexible bale forming means in the form of belts or chains equipped with catch elements define the periphery of the bale-forming chamber. The bale forming means are biased by means of a hydraulic cylinder that acts with a force on an arm carrying a roller on which the bale forming means contacts, so that the size of the bale-forming chamber grows with the taken-up quantity of material. When a specified size or density of the bale is reached, the bale is typically wound with twine, net or film and then a rear door is opened and the bale is ejected from the bale-forming chamber.

U.S. Pat. No. 5,367,865 A1 describes a round baler in which the bale-forming chamber is defined toward the front by several rollers that can be driven to rotate and that are mounted next to one another on a holder that can pivot about the rotational axis of the lowest roller. Toward the back, the bale-forming chamber is defined by a belt that revolves around several rollers. One of these rollers is mounted on the top of the holder and is not driven. Two other rollers wrapped around by belts are mounted on a first arm that can pivot about an axis and that is coupled with a second arm at which another end of the frame of the round baler attaches to a connected hydraulic cylinder used for providing a defined tensile stress in the belt. When the harvested material collects in the bale-forming chamber, the holder pivots with the rollers gradually upward about the rotational axis of the lower roller. At the same time, the belt in the rear area of the baler forms a growing loop. Because the belt is also wrapped around the roller mounted on the holder, the holder and the belt move outward in a coordinated way. Because the belt also revolves around rollers that are mounted on a rear door, the pivoting region of the first arm is sufficient for achieving a sufficient tension also when ejecting the bale.

U.S. Pat. No. 6,094,900 A1 shows a round baler wherein the bale-forming chamber is likewise defined toward the front by rollers mounted on a pivoting holder and toward the back by a belt. The holder is supported by a hydraulic cylinder relative to the frame of the baler and is furthermore extended toward the back and upward and carries, on its rear, upper end, two rollers around which the belt is wrapped. The hydraulic cylinder thus supports the holder on the frame and also defines the tensile stress of the belt. The belt also revolves around rollers mounted on a rear door, so that the pivoting region of the holder is adequate to achieve sufficient tension of the belt also when ejecting the bale.

In U.S. Pat. No. 7,165,491 B2, another round baler is described wherein the bale-forming chamber is defined only by a single bale forming means in the form of belts. The belts revolve around several deflection rollers of which a few are mounted on a first, pivoting arm and others are mounted on a second, pivoting arm. The arms are tensioned against each other by a hydraulic cylinder used for generating the desired tension in the bale forming means. The bale forming means also revolves around two deflection rollers mounted on a pivoting carrier on the bottom side of the baler. The carrier maybe pivoted about its axis extending parallel to the axis of the bale-forming chamber rearward and upward into a bale-ejection position. The two arms allow the belts to also be held sufficiently taut in the bale-ejection position of the carrier.

EP 1 308 078 A1 describes a round baler of the type mentioned above wherein the bale-forming chamber is defined toward the front by rollers that can be driven, of which one is mounted on a pivoting holder, and otherwise by a single bale forming means in the form of belts. The bale forming means revolves, among other things, around a deflection roller connected to the holder, around a deflection roller mounted on a tensioning arm, and around two deflection rollers mounted on a pivoting carrier on the bottom of the baler. The carrier can be pivoted about its axis extending parallel to the axis of the bale-forming chamber rearward and upward into a bale-ejection position. Here, a relatively long tension arm is required, in order to maintain the tension of the belt also in the bale-ejection position of the carrier.

The problem forming the basis of the invention is thus seen in providing a round baler having a mechanism that is improved relative to the state of the art for generating and maintaining the tension of the bale forming means.

SUMMARY OF THE INVENTION

Accordingly, a round baler is provided that comprises a cylindrical bale-forming chamber whose periphery is defined by at least one roller that can be driven and by a flexible bale forming means. The roller is mounted on a moving holder, so that the holder and the roller can move outward with the growing size of a resulting bale, be it on a linear path or a curved path. The bale forming means that may involve, for example, a single, sufficiently wide belt or several belts or one or more chains with catches mounted on these chains, contacts a first rotating body and a second rotating body and wraps around both at least partially. The first rotating body is connected to the holder and moves with it when the bale grows. The second rotating body can likewise move relative to the frame of the round baler and is coupled with the holder by a drive connection with respect to motion. When the holder moves outward with a growing size of the bale, the second rotating body is thus also forced to move by the drive connection, so that its position can be adapted in a suitable way to the growing size of the bale.

In one embodiment of the invention, the tension of the bale forming means is defined by tension-generating means that can interact with another (third) round body that can move relative to the frame of the round baler and around which the bale forming means wrap at least partially. For simplification, however, it is preferable to insert the tension-generating means in the bale forming means in the drive train between the holder and the second rotating body for generating a tensile stress. Consequently, one end of the tension-generating means moves with the holder and the other end of the tension-generating means moves with the second rotating body. In this way, a defined tensile stress is simultaneously generated in the bale forming means and a defined force is exerted on the holder, so that the bale can grow in a controlled way.

The tension-generating means can have a spring and/or a hydraulic cylinder. The latter can be connected to a pressure-limiting valve, in order to achieve a defined pressure in the hydraulic cylinder and thus a desired tension in the bale forming means. In this regard, refer to the state of the art according to U.S. Pat. No. 6,094,900 A1 that is incorporated herein by reference.

In an embodiment of the invention, the holder is connected to the frame of the round baler so that it can pivot about an axis extending parallel to the axis of the bale-forming chamber, i.e., horizontal and perpendicular relative to the forward direction of the round baler, and indeed advantageously on its front, lower end. The drive connection may comprise a first arm that is mounted on the holder and that extends perpendicular to the holder, i.e. in the case of an empty bale-forming chamber and a holder then extending upward and backward at an angle from the axis is located above and possibly in the forward direction of the round baler in front of the holder. In addition, the drive connection may have a second arm on which the second rotating body is supported. The second arm is advantageously connected on the frame of the round baler so that it can pivot about an axis extending parallel to the axis of the bale-forming chamber. This axis is located in the forward direction of the round baler in front of the second rotating body. A lever arm may be connected rigidly to the second arm. The tension-generating means is then mounted advantageously between the first arm and the lever arm, wherein it may be hinged in a pivoting way with two axes extending parallel to the axis of the bale-forming chamber.

Additional belt sections that also contact rotating bodies supported rigidly on the frame of the round baler can connect to the belt section of the bale forming means located between the first and second rotating bodies. Furthermore, the bale forming means may pass between two additional rotating bodies mounted on the holder. One of these rotating bodies can prevent undesired contact of the bale forming means with one of the rollers of the holder, while the other rotating body supports the bale forming means in the bale-ejection position.

The present invention can be used on round balers with a rear door, as described in U.S. Pat. No. 5,367,865 A1 or U.S. Pat. No. 6,094,900 A1, i.e. a rear half of the housing of the round baler that can swing open and comprises, on its bottom, a rotating body around which the bale forming means revolves. Such a rear door causes, in its bale-ejection position, sufficient lift and tightness of the bale forming means that allows a problem-free ejection of the bale. The present invention may also advantageously use round balers with a pivoting carrier that is hinged on the frame of the bale press about an axis extending parallel to the axis of the bale-forming chamber and that may be moved by an actuator between a bale-forming position in which it is located in the lower, rearward region of the round baler and a raised bale-ejection position pivoted about the axis. The carrier supports, at a distance from the axis on its outside, two rotating bodies on which the bale forming means contacts. The drive connection between the holder and the second rotating body, in particular, the tension-generating means, allows the second rotating body to be brought into a position in which it keeps the bale forming means sufficiently taut even in the case of a carrier brought into the bale-ejection position, in order to be able to eject the bales. When the carrier is located in the bale-ejection position, the holder can be locked in its position last assumed during the formation of the bale or a farthest possible raised position.

BRIEF DESCRIPTION OF THE DRAWINGS

The embodiments of the invention are described in more detail below with reference to the accompanying drawing figures wherein.

DESCRIPTION OF THE PREFERRED EMBODIMENT

Figure 1:
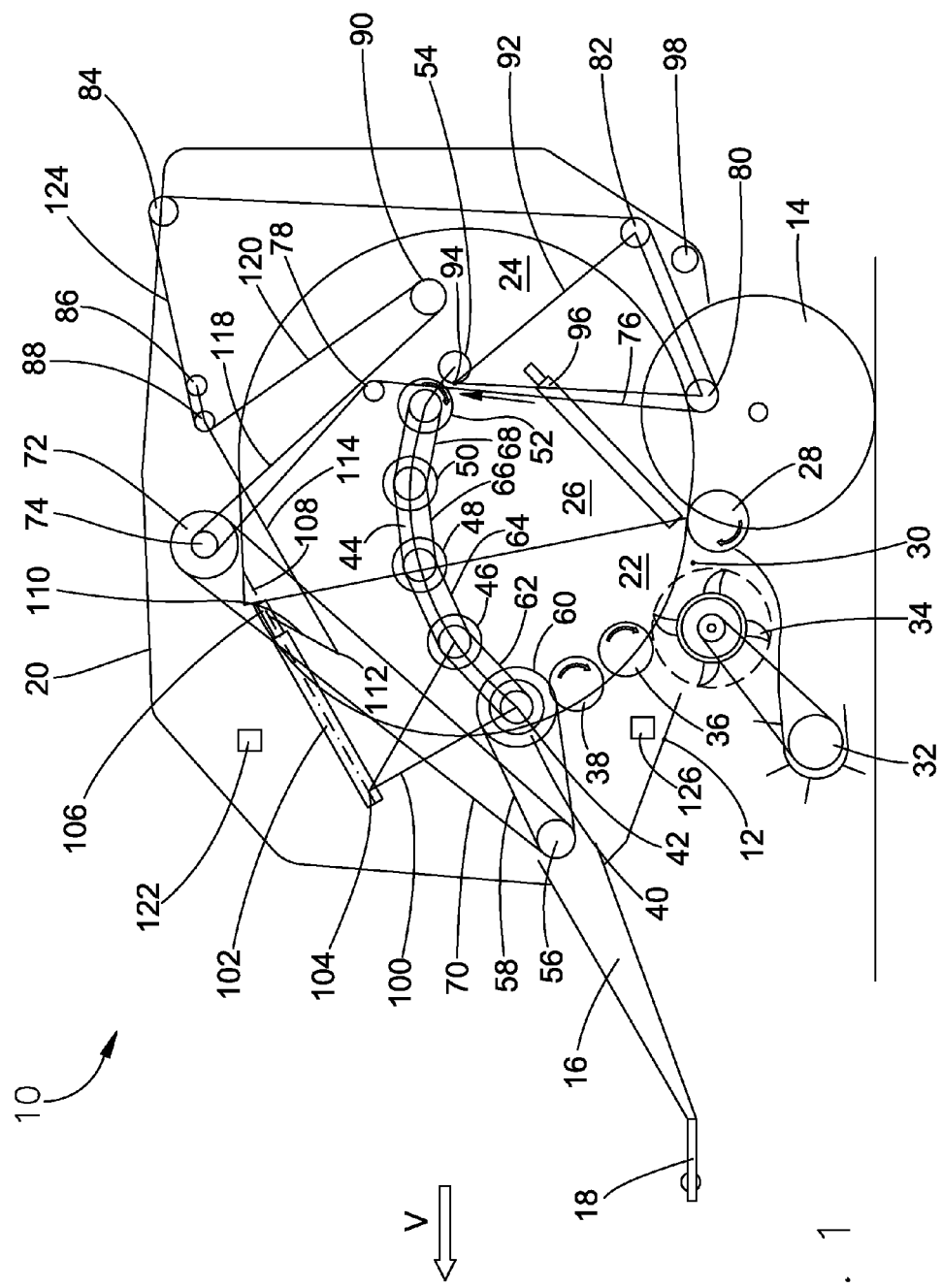
FIG. 1 is a schematic side view of a round baler with empty bale-forming chamber.

In FIG. 1, a baler 10 is shown in a schematic side view. The baler 10 comprises a frame 12 that is supported by wheels 14 on the ground and on whose front a tow bar 16 is attached that can be coupled by means of a front towing eye 18 onto a coupling jaw of a tractor (not shown). The baler 10 is covered and enclosed from the outside by a housing 20 whose top and rear, however, are open, as will be explained later with reference to FIGS. 2 and 4. In the following, directional specifications, such as front, rear, top, and bottom, refer to the forward direction V that runs from right to left in FIGS. 1-4.

Within the baler 10, a bale-forming chamber 26 is defined downward by a roller 28 that can be driven and in which an opening 30 connects toward the front through which harvested material picked up from the ground by means of a pick-up device 32 and fed backward and upward by a connecting transfer rotor 34 is introduced into the bale-forming chamber 26. At the side, the bale-forming chamber is defined by front walls 22 and rear walls 24, wherein the front walls 22 are advantageously mounted rigidly on the frame 12, while the rear walls 24 can be moved advantageously slightly outward by suitable actuators for reducing the friction during the ejection of a bale.

Above and in front of the opening 30 there are two additional rollers 36, 38 that can be driven like the roller 28 and that are supported rigidly on the frame 12. Above the upper roller 38 there is a roller 40 about whose rotational axis 42 an essentially circular-arc-shaped holder 44 is supported so that it can rotate. The holder 44 carries an additional four driven rollers 46, 48, 50, and 52 and three free-running rotating bodies 54, 78, 90.

A drive train driven by the tractor drives, by way of a belt disk 56, a belt 58, and a belt disk 60, the roller 40 and, by way of additional belt drives 62, 64, 66 and 68, the rollers 46, 48, 50, and 52. In addition, the drive train driven by the tractor drives the rollers 28, 36, and 38, as well as the pick-up device 32 and the transfer rotor 34, and, by means of a belt 70, a belt disk 72 for the drive of a bale forming means drive rotating body 74.

Toward the back, the bale-forming chamber 26 is defined by flexible, continuous bale forming means 76 that revolve around the bale forming means drive rotating body 74, the rotating bodies 54, 78, and 90, as well as around rotating bodies 80, 82, 84, 86, and 88. The flexible bale forming means 76 can involve one or more belts or one or more chains with catches attached to them. If one or more belts are used, then the rotating bodies 54, 74, 78, 80, 82, 84, 86, 88, and 90 are constructed as rollers or cylinders, and if chains with catches are used as the bale forming means, then they are constructed as chain pinions sitting on a shaft or axle. The rotating bodies 78 and 90 are mounted, like the rotating body 54, on the holder 44 so as to move with it about the rotational axis 42. All of the rollers and rotating bodies 28, 36, 38, 40, 46, 48, 50, 52, 74, 78, 80, 82, 84, 86, 88, and 90 extend horizontally and perpendicular relative to the forward direction V, are supported so that they can rotate about their axes, and extend across the width of the bale-forming chamber 26. The rotating bodies 80 and 82 located in the lower region of the flexible bale forming means 76 are mounted on a triangular carrier 92 that is hinged at its upper tip 94 on the frame 12 so that it can pivot about an axis extending horizontal and perpendicular relative to the forward direction and can be moved about this axis by at least one external-force-activated actuator 96. The carrier 92 also holds another rotating body 98 underneath the bale forming means 76. The rotating bodies 74 and 84 can rotate but are otherwise mounted fixed on the frame 12.

Figure 5:
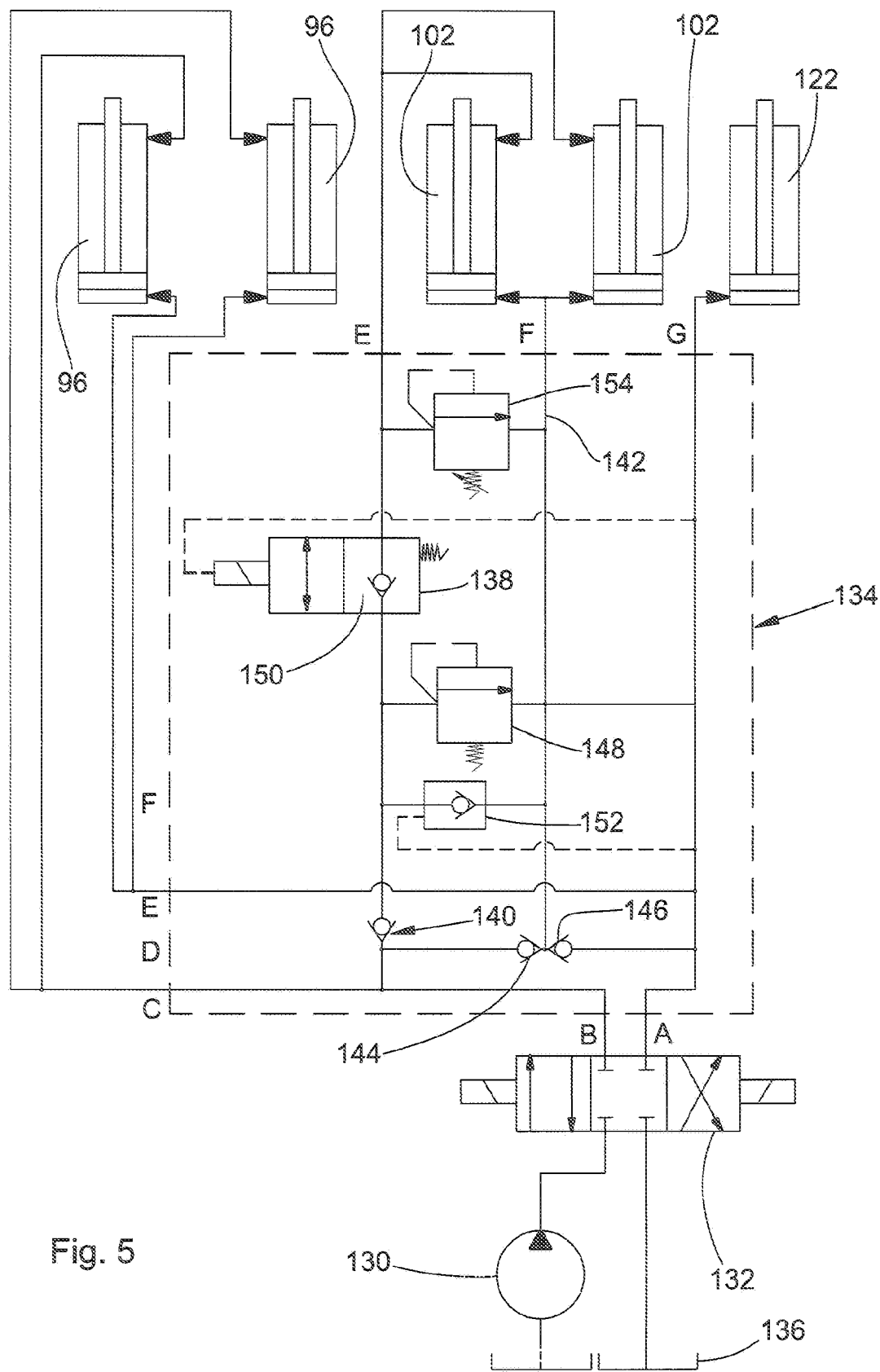

On the holder 44, a first arm 100 is mounted that extends upward and forward perpendicular to the connection line between the rollers 40 and 46 and on whose outer end away from the holder, tension-generating means 102 are hinged in the form of a hydraulic cylinder that can pivot about an axis 104 extending horizontally and perpendicular to the forward direction and consequently parallel to the axis of the bale-forming chamber 26. The moving output 106 of the tension-generating means 102 is hinged on a lever arm 110 so that it can pivot about an axis 108 extending parallel to the axis of the bale-forming chamber 26, wherein, on its side, this lever arm is hinged on the frame 12 so that it can pivot about an axis 112 extending parallel to the axis of the bale-forming chamber 26 and is connected rigidly to a second arm 114 that carries, on its outer end, the rotating bodies 88 and 86 arranged one after the other. The arms 100 and 114, the lever arm 110, and the tension-generating means 102 form a drive connection between the holder 44 and the rotating bodies 88 and 86, with this connection forcibly coupling the position of the rotating bodies 88, 86 with the position of the holder 44. With the growing bale in the bale-forming chamber 26, and thus with the outward moving holder 44, the rotating bodies 88, 86 are consequently forcibly tracked and provide the desired tension in the bale forming means 76. The tension-generating means 102 is set by a suitable valve controller under pressure so that the desired tension of the bale forming means 76 is generated. This valve controller advantageously comprises a pressure-limiting valve 154 that maintains the desired pressure in the plunger rod chamber of the hydraulic cylinder and the desired tension in the bale forming means 76. A suitable switch is shown in FIG. 5.

Starting from the bale forming means drive rotating body 74, the bale forming means 76 extends around the rotating body 90 supported on the holder 44, around the rotating bodies 88, 86 supported on the second arm 114, around the frame-fixed rotating bodies 84, around the rotating bodies 82, 80 supported on the carrier 92, and around the rotating body 78 that is supported on the holder 44 and that is used to keep the bale forming means 76 away from the roller 52. The function of the rotating bodies 54 and 98 will be made clear later with reference to FIGS. 2 and 4. In bale-forming mode, the bale forming means drive rotating bodies 74 rotate in the clockwise direction, so that the belt section of the bale forming means 76 defining the bale-forming chamber 26 toward the back is moved upward. The rollers 28, 36, 38, 40, 46, 48, 52 likewise rotate in the clockwise direction, so that the harvested material introduced into the bale-forming chamber 26 travels on a spiral path in the counterclockwise direction. However, opposite rotational directions would also be conceivable. In the case of an empty bale-forming chamber 26, the carrier 44 lies on a lower stop (not shown).

According to all of the preceding, the following function of the round baler 10 is given. In FIG. 1, the bale-forming chamber 26 is empty and, in harvesting mode, the round baler 10 is pulled across a field by the tractor (not shown), wherein it picks up, from the field, harvested material laid in a swath by means of the pick-up device 32 and introduces it via the transfer rotor 34 into the bale-forming chamber 26 in which it travels on the mentioned, spiral path by means of the bale forming means 76 moving upward and the rollers 28, 36, 38, 40, 46, 48 and 52 rotating in the counterclockwise direction.

Figure 2:
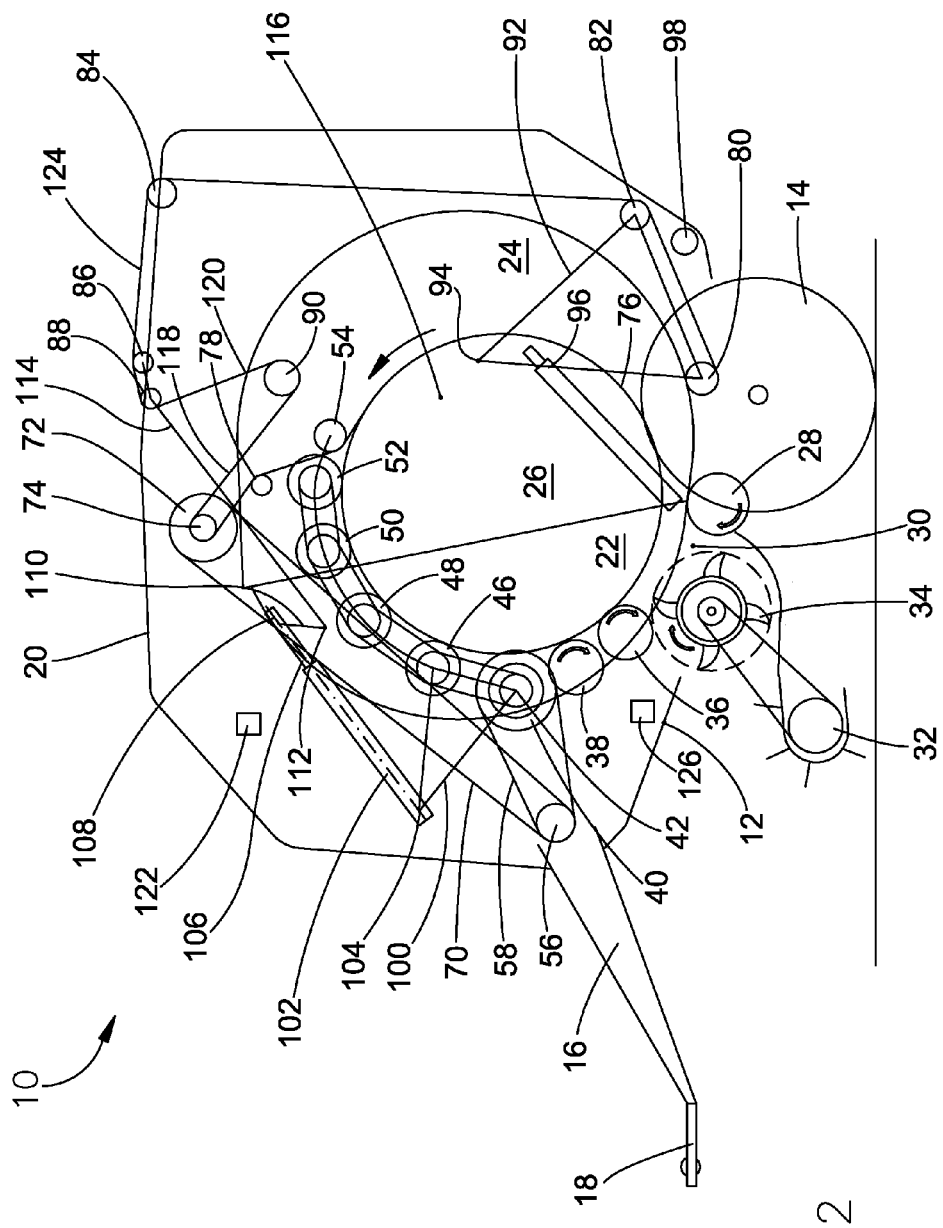
FIG. 2 is a side view of the round baler from FIG. 1 with partially filled bale-forming chamber.

Thus, a gradually growing bale 116 is created, as shown in FIG. 2. It can be seen there that the holder 44 is pivoted upward due to the bale 116 forming in the bale-forming chamber 26 by some multiple of 10° about the axis 42 in the counterclockwise direction, and with it the rotating bodies 54, 78, 90. The belt sections 118 and 112 of the bale forming means 76 between the rotating body 90 and the bale forming means drive rotating body 74 on one side and the rotating body 88 on the other side relative to the empty bale-forming chamber 26 shown in FIG. 1 are shortened, because the rotating body 90 is pivoted upward with the holder 44. Simultaneously, the rotating body 88 is also pivoted upward with the second arm 114 about the axis 112, caused by the motion of the first arm 100 and a stretching motion of the output 106 of the tension-generating means 102 leading in the opposite direction, wherein this motion is produced by the pressure acting in the plunger-rod chamber of the tension-generating means and limited by the pressure-limiting valve 154. The length of the bale forming means 76, becoming free during the movements of the rotating bodies 86 and 90, wraps around the rear part of the bale 116 and bulges out toward the back. Accordingly, the bale forming means 76 wraps around the rotating body 54 partially, because the latter forms an upper, rear limit of the region of the bale forming means 76 enclosing the bale-forming chamber 26. The housing 20 is open at the top, so that the rotating bodies 88, 86 can move upward out from the housing.

Figure 3:
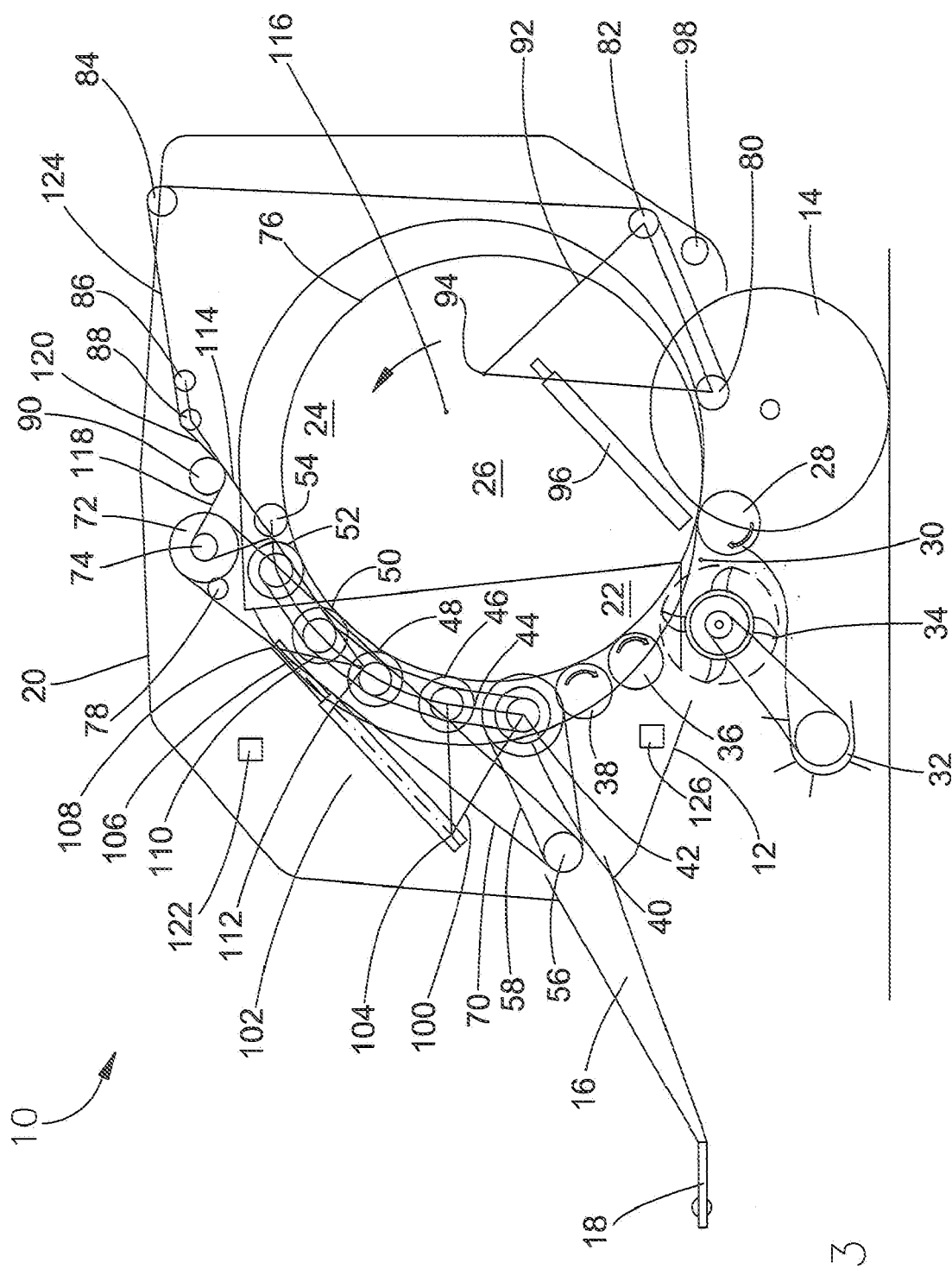
FIG. 3 is a side view of the round baler from FIG. 1 with completely filled bale-forming chamber.

In the situation shown in FIG. 3, the bale 116 has grown to the maximum possible size and the carrier 44 contacts an upper stop (not shown). Relative to the position in FIG. 2, the carrier 44 is pivoted upward even farther about the axis 42, so that the rotating bodies 54 and 90 (and the now non-functioning rotating body 78) are likewise moved even farther upward. Due to the prevailing pressure ratios in the tension-generating means 102, their output 106 is moved even farther outward, so that the rotating bodies 88, 86 are pivoted downward again about the axis 112 relative to the situation in FIG. 2. The belt sections 118, 120 are therefore shortened again relative to FIG. 2 and their missing length wraps around the rear part of the bale 116. A signal to stop is output to the operator of the tractor unit or to its drive controller, so that no more harvested material comes into the bale-forming chamber 26. In addition, the bale 116 can be wound with a winding material (twine, netting, film, etc.). The drive for the rollers and rotating bodies 28, 36, 38, 40, 46, 48, 50, 52, 74, 78, 80, 82, 84, 86, 88 and 90 is then stopped and optionally the rear wall 24 is moved outward laterally. Then the bale 116 is ready to be ejected.

Figure 4:
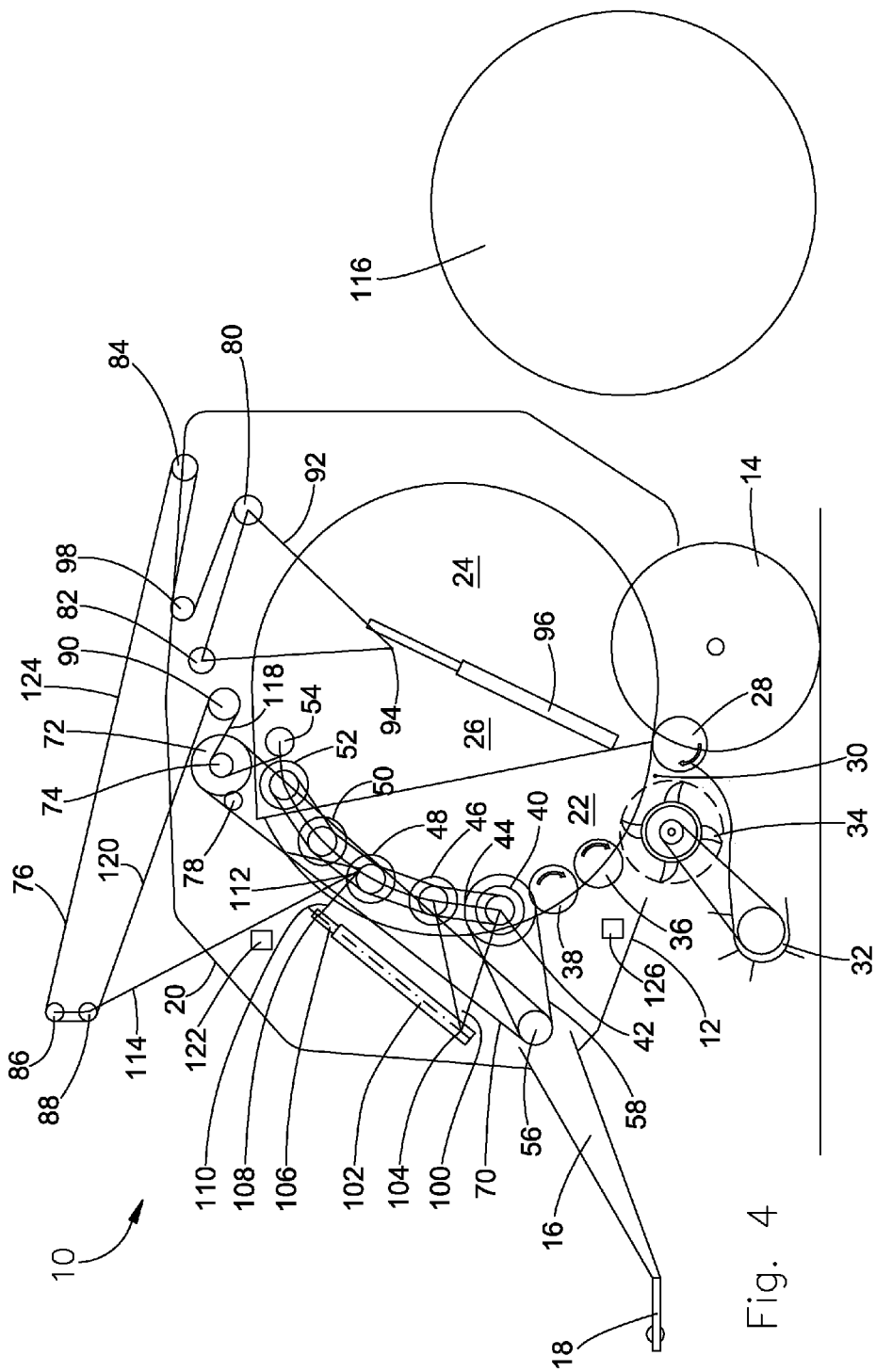
FIG. 4 is a side view of the round baler from FIG. 1 during the ejection of the bale; and, FIG. 5 is a hydraulic diagram of the round baler.

In FIG. 4, the carrier 92 has been moved by the actuator 96 about the axis 94 backward and upward into the bale-ejection position and the bale 116 has been ejected from the bale-forming chamber 26. The carrier 44 is still located in the position from FIG. 3 and can be held there by a locking device 122. Because the carrier 92 is moved into the bale-ejection position, the bale 116 can roll out due to the force of gravity from the bale-forming chamber 26 onto the ground, advantageously on a chute (not shown). In order to take up the length of the bale forming means 76 becoming free during the pivoting of the carrier 92 about the axis 94, the output 106 of the tension-generating means 102 is retracted again by suitable loading, which leads to the result that the rotating bodies 86, 88 on the second arm 114 are rotated far forward and upward about the axis 112 and are located outside of the housing 22 above the round baler 10 and their front and the belt section 120 and also the belt section 124 have become rather long between the rotating body 86 and the rotating body 84. Here, the rear or upper rotating body 86 still allows sufficient take-up of a length of the bale forming means 76. In this position, the rotating body 98 of the carrier 92 forms, with the rotating bodies 80 and 84, a double loop of the bale forming means 76, with this loop also taking up a part of the length of the bale forming means 76 becoming free during the upward pivoting of the carrier 92 into the bale-ejection position. After the ejection of the bale 116, the locking device 122 can be released and the carrier 92 can be pivoted by the actuator 96 back into the bale-forming position, as shown in FIGS. 1-3.

It should also be noted that a controller 126 controls the functioning of the round baler 10 and can drive, in particular, the actuator 96 and the tension-generating means 102 by means of suitable valves, as shown in FIG. 5. In addition, the controller 126 may be connected to a sensor (not shown) for the size and/or density of the bale 116 and may automatically trigger the winding process as well as the stopping of the tractor unit when the bale 116 reaches a selectable or permanently specified size (which may be smaller than the maximum size of the bale) and may control the functions described above for the actuator 96, the locking device 122, and the tension-generating means 102. In the case of bale sizes smaller than the maximum bale size, the locking device 122 can lock the carrier 44 in the last assumed position or move it into the highest possible position, as shown in FIGS. 3 and 4.

In FIG. 5, a hydraulic diagram of the round baler 10 is shown. The pressure provided by a pump 130 arranged onboard the tractor unit is transferred to the valve arrangement 134 of the controller 126 via a control valve 132 that is controlled by the operator of the tractor unit or automatically by the controller 126 and that is located on board the round baler 10. A second connection of the control valve 132 is connected to a tank 136. The two chambers of the actuators 96 provided on both sides of the round baler 10 and constructed as hydraulic cylinders are each connected directly to one of the output lines A, B of the control valve 132. The plunger chamber of a hydraulic cylinder of the locking device 122 is also connected directly to one of the output lines A of the control valve 132. The plunger-rod chambers of the tension-generating means 102 provided on both sides of the round baler 10 and also constructed as hydraulic cylinders are connected via an electromagnetically controlled valve 138 and a sieve valve 140 to one of the output lines B of the control valve 132. The sieve valve 140 is used for maintaining the pressure in the tension-generating means 102. The plunger chambers of the tension-generating means 102 are connected to a line 142 that is connected via sieve valves 144, 146 to the output lines A, B of the control valve 132, which each allow flow into the plunger chambers during stretching of the tension-generating means 102 and flow out from the plunger chambers during contraction. In the open state, the valve 138 allows a control of the pressure in the plunger-rod chamber of the tension-generating means 102 by means of a pressure-limiting valve 148, in order to generate a soft bale core, and, in the closed state of the valve 138, an overflow valve 150 contained therein becomes active, which opens by means of the actuator 96 when the carrier 92 is raised, in order to contract the tension-generating means 102. A pilot valve 152 connected parallel to the pressure-limiting valve 148 between the inlet of the valve 138 and the line 142 allows the free movement of the tension-generating means 102 in the case of stretched actuators 96. Another pilot valve 154 is arranged between the output of the valve 150 and the line 142 and limits the pressure in the plunger-rod chamber of the tension-generating means and defines the density of the bale. The shown hydraulic circuit allows the previously described functions of the round baler 10.

The round baler 10 according to the invention with the drive connection between the holder 44 and the rotating bodies 86, 88 has the advantages that, despite the shortest possible bale forming means 76, a relatively large bale 116 can be generated, that the rotating bodies 86, 88 at empty bale-forming chamber 26 remain within the outline of the housing 22 and the bale forming means 76 are still held taut also in the case of the carrier 92 brought into the bale-ejection position. Another advantage of the round baler 10 described here lies in that parts of round balers that are already known can be used, like the holder 44 with the rollers 40, 46, 48, 50, 52 or the carrier 92.

Having described the preferred embodiment, it will become apparent that various modifications can be made without departing from the scope of the invention as defined in the accompanying claims.

The invention claimed is:

1. A baler for producing round bales, the baler having:
    a bale-forming chamber;
    at least one roller that is driven and defines a part of an extent of the bale-forming chamber and that is mounted on a moving holder; and,
    continuous, flexible bale forming means that is driven and that defines another part of the extent of the bale-forming chamber and that contacts a first rotating body and a second rotating body of which the first rotating body is mounted on the holder;
    wherein the second rotating body is coupled with the holder with respect to motion by a drive connection and is biased by tension-generating means, in order to tighten the bale forming means, the tension-generating means being inserted in the drive connection between the holder and the second rotating body.

2. The baler according to claim 1, wherein the tension-generating means comprises a hydraulic cylinder.

3. The baler according to claim 2, wherein the hydraulic cylinder is connected to a pressure-limiting valve for controlling the bale density.

4. The baler according to claim 1, wherein the holder pivots on a lower, front end about an axis extending parallel to the axis of the bale-forming chamber.

5. The baler according to claims 1, wherein the drive connection comprises a first arm mounted on the holder and in the case of an empty bale-forming chamber located above the holder.

6. The baler according to claim 5, wherein the drive connection comprises a second arm that pivots about an axis, with this axis being fixed relative to the baler and extending parallel to the axis of the bale-forming chamber, and wherein the second rotating body is mounted on the second arm.

7. The baler according to claim 6, wherein the drive connection comprises a lever arm connected rigidly to the second arm.

8. The baler according to claim 7, wherein the first arm is connected to one end of the tension-generating means so that it pivots about an axis extending parallel to the axis of the bale-forming chamber, and that the lever arm is connected to the other end of the tension-generating means so that it pivots about an axis extending parallel to the axis of the bale-forming chamber.

9. The baler according to claim 8, wherein additional belt sections contact round-bale-fixed rotating bodies connected to the belt section of the bale forming means extending between the first rotating body and the second rotating body.

10. The baler according to claim 9, wherein the bale forming means passes through two rotating bodies connected to the holder and comes to lie on at least one of the rotating bodies.

11. The baler according to claim 10, wherein in its lower, rear region, a carrier is positioned to pivot about an axis extending parallel to the bale-forming chamber and that carries two rotating bodies on which the bale forming means contacts, and wherein this carrier is brought into a raised bale-ejection position pivoted about the axis by an actuator.

12. The baler according to claim 11, wherein the tension-generating means is brought into a retracted position for a carrier brought into the bale-ejection position, in order to tighten the bale forming means.

13. The baler according to claim 11, wherein the holder is brought into a retracted position for a carrier locked in one of its last-reached position and a farthest possible raised position for the formation of the bale.

* * * * *